(12) United States Patent
Yoshitake et al.

(10) Patent No.: US 6,761,990 B1
(45) Date of Patent: Jul. 13, 2004

(54) SOLID POLYMER ELECTROLYTE FUEL CELL

(75) Inventors: Masaru Yoshitake, Yokohama (JP); Eiji Yanagisawa, Yokohama (JP); Eiji Endoh, Yokohama (JP); Yasuhiro Kunisa, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/889,776

(22) PCT Filed: Jan. 20, 2000

(86) PCT No.: PCT/JP00/00256

§ 371 (c)(1), (2), (4) Date: Jan. 23, 2001

(87) PCT Pub. No.: WO00/44059

PCT Pub. Date: Jul. 27, 2000

(30) Foreign Application Priority Data

Jan. 21, 1999 (JP) .............................. 11-013437

(51) Int. Cl.$^7$ ................................ H01M 8/02

(52) U.S. Cl. ............................ 429/34; 429/38; 429/39; 429/35; 429/36

(58) Field of Search ................... 429/34, 35, 36, 429/37, 38, 39, 12, 30

(56) References Cited

U.S. PATENT DOCUMENTS

| 5,736,269 A | 4/1998 | Okamoto et al. |
| 6,087,032 A | 7/2000 | Yoshitake et al. |
| 6,372,373 B1 * | 4/2002 | Gyoten et al. ................. 429/35 |
| 6,383,678 B1 * | 5/2002 | Kaneko et al. ................ 429/34 |

FOREIGN PATENT DOCUMENTS

EP    0 780 916 A1    6/1997

* cited by examiner

Primary Examiner—Bruce F. Bell
Assistant Examiner—M. Wills
(74) Attorney, Agent, or Firm—Oblon, Spivak, McClelland, Maier & Neustadt, P.C.

(57) ABSTRACT

A polymer electrolyte fuel cell comprising a plurality of membrane electrode assemblies laminated via separators, each assembly comprising a membrane-form polymer electrolyte and a pair of a fuel electrode and an air electrode facing each other via the electrolyte, wherein as the separator, a separator made of a metal/non-metal composite material, is used which has a fuel gas channel, an oxidant channel and a fluid channel for cooling, and at least side walls of the fluid channel for cooling are made of metal and at least faces which are in contact with the membrane electrode assemblies are made of non-metal. The separators are excellent in the dimensional stability and air-tightness and light in weight, and the polymer electrolyte fuel cell having such separators can maintain a high performance constantly for a long time.

19 Claims, 3 Drawing Sheets

(a)   (b)

SOLID POLYMER ELECTROLYTE FUEL CELL

TECHNICAL FIELD

The present invention relates to a polymer electrolyte fuel cell, particularly to a separator therefor.

BACKGROUND ART

A polymer electrolyte hydrogen-oxygen fuel cell is excellent in its output characteristics, whereby its application to e.g. automobiles, is expected. For practical application of the above fuel cell, it is required to develop a fuel cell which provides a high output density and a high energy efficiency constantly over a long period of time even under such an operational condition that the utilization ratios of a fuel and air are high.

The polymer electrolyte fuel cell usually has a construction such that a pair of power generation electrodes (a fuel electrode and an air electrode) face each other via a polymer electrolyte, and the pair of electrodes and the electrolyte are bonded to form a membrane electrode assembly. A plurality of such assemblies are laminated via separators, and the entire assembly is clamped to be integral (stacked).

Here, the separator has channels for supplying a fuel gas and an oxidant gas (such as air) to the electrodes, and it serves as a partition plate between the adjacent two units. Accordingly, the separator is required to have characteristics such that the gas permeability is low, it is light in weight, it is excellent in corrosion resistance and oxidation resistance when exposed to a steam atmosphere at a temperature of from room temperature to a vicinity of 150° C. as the operational temperature of the fuel cell, it has good electrical conductivity for a long period of time, and it can be mechanically processable. Further, the separator is required to be a good conductor for electricity and heat in order to efficiently remove electricity and heat generated by a reaction of the cell out of the cell system.

As conventional separator materials, carbon type bulk materials such as artificial graphite and glassy carbon, are known. However, the carbon type materials are poor in toughness and brittle, whereby the following problems are likely to occur when it is used as a separator under such a condition that a stress other than a compression stress, or a mechanical shock, is likely to be exerted. Namely, the problems are such that the separator itself is broken, whereby the shape can not be maintained, cracking is likely to form, whereby air tightness can not be maintained, mechanical forming or processing is difficult, whereby the processing cost tends to be high, and recycling is difficult.

As a means to solve the above problems, it has been proposed to use as a separator a molded product obtained by subjecting flat graphite powder particles so called expanded graphite (such as Grafoil, tradename, manufactured by UCAR Co.) to dispersion treatment by e.g. an acid and adding a binder, followed by molding. This molded product is a flexible material which can be mechanically processable by e.g. pressing, whereby the problems relating to the toughness and the mechanical shock resistance, are overcome. However, such a molded product has a problem such that the mechanical strength is low, and the shape can hardly be maintained when made thin, or it is susceptible to deforming even when a small stress is applied thereto.

Further, the fuel cell is required to be small in size and light in weight and to provide a high output especially when it is used as a power source for an automobile, and it is necessary to increase a power per unit volume and to cool a heat generated by conducting electricity and by a reaction of the cell with a compact structure. Especially when a fluorine-containing polymer electrolyte having a high electrical conductivity, is used, this cooling will be essential, since the heat resistant temperature of the electrolyte is usually not so high. Cooling can be accomplished with the most compact structure when a fluid is permitted to flow at a high flow rate through a narrow and long channel formed in a separator, specifically, when water is permitted to flow under a high pressure. However, when the above-mentioned expanded graphite is used as the separator material, if the separator is maintained in the presence of water at a high temperature, the water is likely to penetrate into laminated particles of graphite, whereby the shape can not be maintained, thus leading to a problem that a long term reliability can not be attained.

As a means to solve the above-mentioned problems of the separator made of a carbon material, an attempt has been made to use a metal such as a surface-treated stainless steel, titanium or aluminum as the separator material (e.g. EP0780916). When a metal is employed, the mechanical processing will be easy, the strength will be high even thin, the toughness, the mechanical shock resistance, the fluid shielding property, and thermal and electrical conductivity will be excellent. However, the metal material has problems such that the specific gravity is large (for example, 8.0 with stainless steel, 4.5 with titanium and 2.7 with aluminum), whereby the output per unit mass of the fuel cell tends to be low.

Therefore, the present invention has an object to provide a polymer electrolyte fuel cell having a separator which is made of a material which can easily be formed and processed, whereby the shape and air tightness can be maintained even when a stress other than a compression stress, a mechanical shock, vibration, etc., are exerted, and the initial good electrical conductivity can be maintained over a long period of time even when exposed to a steam atmosphere from room temperature to the vicinity of 150° C. as the operational temperature of the fuel cell, and which is light in weight and industrially practical.

DISCLOSURE OF THE INVENTION

The present invention provides a polymer electrolyte fuel cell comprising a plurality of membrane electrode assemblies laminated via separators, each assembly comprising a membrane-form polymer electrolyte and a pair of a fuel electrode and an air electrode facing each other via the electrolyte, wherein the separator has a fuel gas channel for supplying a fuel gas to the fuel electrode, an oxidant channel for supplying an oxidant to the air electrode and a fluid channel for removing a heat generated by a reaction out of the cell system, and the separator is made of a metal/non-metal composite material which has faces made of non-metal which are in contact with the membrane electrode assemblies and side walls of the fluid channel which are made of metal.

In the present invention, the separator has a role to provide a fuel gas and an oxidant to the fuel electrode and the air electrode, respectively, and a role to circulate a fluid for cooling to remove a heat generated by conduction of electricity and by a reaction of the cell out of the cell system. Here, air is used mainly as the oxidant, and accordingly, the electrode to which the oxidant is supplied, will be referred to as an air electrode in this specification. As the fluid for cooling, water is preferred, since the heat can thereby be efficiently removed. Further, the separator has a role to shield a gas or moisture to prevent permeation of the gas or moisture between the adjacent two membrane electrode assemblies and a role to transmit the generated electric current.

The fuel gas channel and the oxidant channel usually consist of grooves formed by ribs formed on the surface of the separator. Such a gas channel may consist of a plurality of linear or curved grooves, but a meandering groove may be formed over the entire surface of the separator so that it has only one inlet and one outlet for a gas.

In the present invention, the separator is made of a metal/non-metal composite material, and at least side walls of the fluid channel for cooling are made of metal. Accordingly, even when the above side walls are exposed to water as the fluid for cooling at a temperature of up to about 150° C. as the operational temperature of the fuel cell, the water for cooling will not penetrate into the interior of the separator, and the shape of the separator can be maintained.

Further, in the separator in the present invention, at least faces which are in contact with the membrane electrode assemblies, are made of non-metal. The separator has a role to conduct an electric current, the above non-metal is preferably made of a highly electrically conductive carbon material. Particularly preferably, it is made of a molded product obtained by subjecting expanded graphite particles to dispersion treatment with e.g. an acid, adding a binder, followed by molding. Such a molded product is readily mechanically processable by e.g. pressing and is light in weight.

In order to reduce the weight of the separator in the present invention, it is preferred that the proportion of the non-metal in the metal/non-metal composite material is as large as possible. Accordingly, from this viewpoint, it is preferred that all other than the side walls of the fluid channel is composed of the non-metal. However, from the production efficiency of the separator and high strength of the separator, it is preferred that a layer made of metal having a fluid channel internally (hereinafter referred to as a metal layer) is sandwiched between a pair of layers made of non-metal having gas channels on their surfaces (hereinafter referred to as non-metal layers) and bonded to constitute the separator. Here, the pair of non-metal layers sandwich the metal layer so that the gas channels will be located on the surfaces.

In this case, the non-metal layers may be the above-mentioned molded products composed of expanded graphite particles. However, they may be those formed on the metal layer by a printing method or a coating method by using a conductive paste containing a highly electrically conductive carbon material.

In the present invention, the metal constituting the separator is preferably one member selected from the group consisting of a metal containing aluminum in an amount of at least 80% of the total mass of metal, a metal containing titanium in an amount of at least 80% of the total mass of metal and stainless steel. Here, the metal includes an alloy. These metals have high strength even when they are thin, and they are excellent in reliability against a dynamic shock such as vibration or mechanical shock and against a static mechanical load such as tension or compression. Further, they are capable of maintaining their shapes even when exposed to a fluid such as water at a high temperature for a long period of time, and they are excellent also in thermal and electrical conductivity.

In the above-mentioned metal containing aluminum or the metal containing titanium, if the content of aluminum or titanium as the main component, is less than 80%, the specific gravity of metal constituting the separator tends to be large, such being undesirable. The content of aluminum or titanium is particularly preferably from 90 to 98%.

The metal containing aluminum as the main component is light in weight, easy for recycling and mechanically readily processable, such being desirable. As the aluminum alloy, an alloy of aluminum with at least one metal selected from the group consisting of magnesium, manganese, silicon, copper, nickel, lithium, zinc, lead, bismuth, titanium and tin, is preferred. For example, duralumin, silumin, hydrosodium or anticorroidal may be mentioned.

Further, the metal containing titanium as the main component has high mechanical strength per unit weight and relatively high corrosion resistance, such being desirable. For example, an alloy of titanium with at least one metal selected from the group consisting of aluminum, iron, vanadium, molybdenum, manganese, chromium, zirconium, tin, silicon, palladium and tantalum, is a corrosion resistant alloy and preferred.

Further, stainless steel has high mechanical strength per unit volume and relatively high corrosion resistance, such being desirable. The stainless steel is not particularly limited, and any one of austenite type, ferrite type and martensite type, may be employed. From the viewpoint of corrosion resistance, austenite type stainless steel is particularly preferred.

It is preferred that a coating film containing ceramics and having a resistivity of at most $3 \times 10^{-4}$ Ω·cm, particularly from $3 \times 10^{-6}$ to $1 \times 10^{-4}$ Ω·cm, is formed on the surface of side walls of the fluid channel made of the metal, i.e. on the surface of the above metal which is in contact with the fluid. By the formation of the coating film containing ceramics, deterioration of the metal surface by oxidation can be prevented. If the resistivity of the coating film exceeds $3 \times 10^{-4}$ Ω·cm, the resistivity of the overall fuel cell tends to be high, whereby it may happen that the energy can not efficiently be taken out. This coating film may be a coating film composed solely of ceramics, or a coating film having ceramics dispersed in metal.

Further, it is preferred that a layer containing ceramics and having a resistivity of at most $3 \times 10^{-4}$ Ω·cm, is disposed at the interface between the metal and the non-metal constituting the separator. In the polymer electrolyte fuel cell, water is formed at the air electrode along with the reaction of the cell. Further, usually, in order to maintain the ion conductivity of the polymer electrolyte, the fuel gas and the oxidant gas are supplied to the respective channels, as wetted so as not to dry the electrolyte. Such formed water and the steam contained in the gas will not flow rapidly and in a large amount like water as the fluid for cooling, whereby even if the non metal portion of the separator is exposed to them, the shape of the separator will not be disintegrated.

However, such water contents are likely to penetrate through the non metal portion of the separator and reach the interface between the metal and the non-metal. Consequently, it is likely that the surface of the metal in contact with the non-metal will be oxidized, whereby the electrical conductivity tends to decrease. Here, if a layer made of ceramics excellent in the durability as compared with the metal, is present at the interface between the metal and the non-metal, deterioration of the metal can be prevented. Further, if the resistivity of this layer made of ceramics exceeds $3 \times 10^{-4}$ Ω·cm, the resistivity of the overall fuel cell tends to be high, whereby the energy may not efficiently be taken out. The resistivity of this layer is particularly preferably from $3 \times 10^{-6}$ to $1 \times 10^{-4}$ Ω·cm. This layer may be a layer composed solely of ceramics or a layer having ceramics dispersed in metal.

BEST MODE FOR CARRYING OUT THE INVENTION

Figure 1:
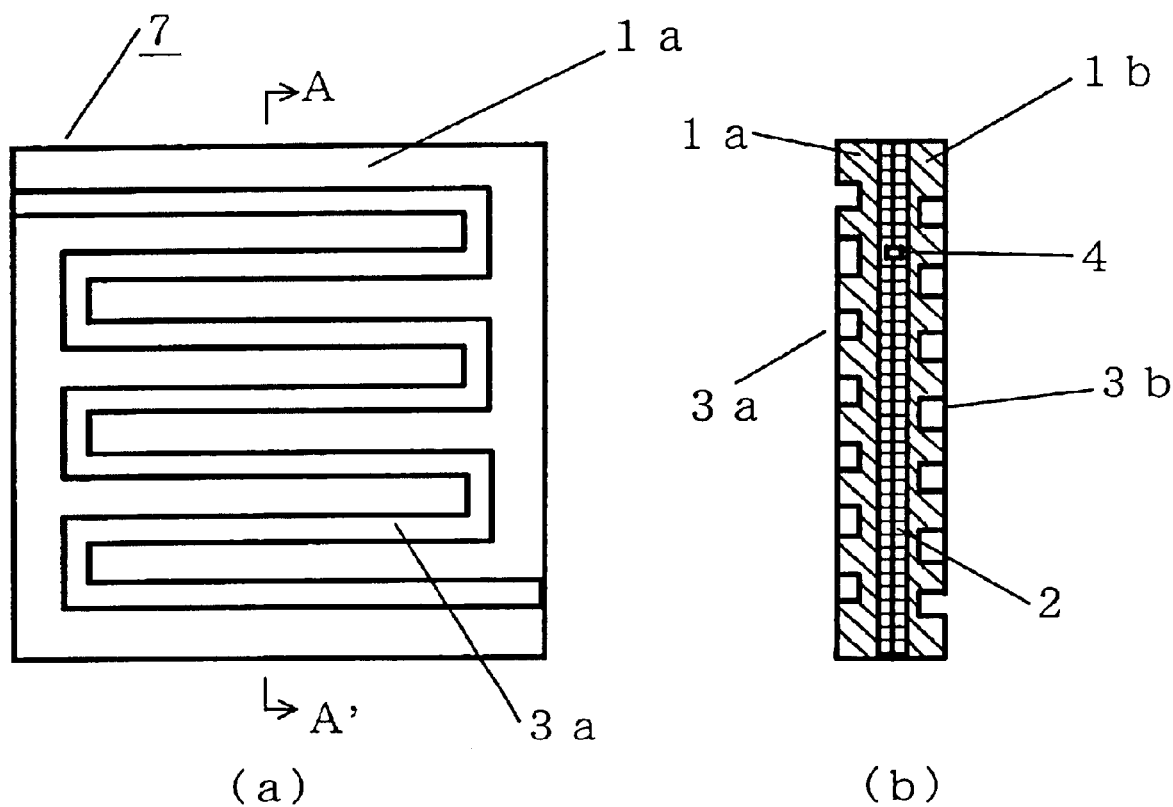
FIG. 1(a) is a plan view of a separator of an embodiment of the present invention.
FIG. 1(b) is a cross-sectional view taken along line A–A' of FIG. 1(a).
Figure 2:
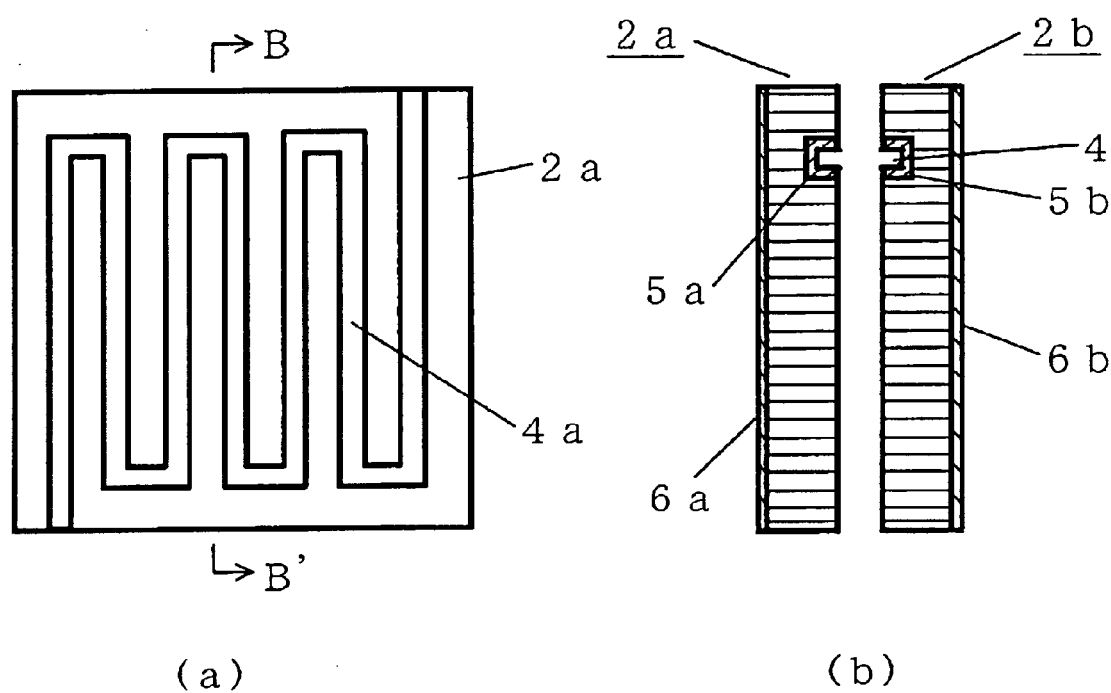
FIG. 2(a) is a plan view of a metal substrate to form the metal layer of the separator of an embodiment of the present invention.
FIG. 2(b) is a cross-sectional view of the metal substrate taken along line B–B' of FIG. 2(a) and the cross-sectional view of a metal substrate paired with said metal substrate.

Now, practical embodiments of the present invention will be described with reference to FIGS. 1, 2 and 3.

FIG. 1(a) is a plan view of a separator 7 as viewed from the air electrode side or from the fuel electrode side, and FIG. 1(b) is a cross-sectional view of the separator 7 taken along the line A–A' of FIG. 1(a). In the separator 7, a metal layer 2 is disposed between a non-metal layer 1a and a non-metal layer 1b.

On the surfaces of the non-metal layers 1a and 1b, gas channels 3a and 3b are formed, respectively. The gas channels 3a and 3b are composed of grooves formed on the surfaces of the non-metal layers 1a and 1b. The grooves have one portion each for the inlet and the outlet of the gas, and they are formed as meandering over the entire surfaces of the non-metal layers 1a and 1b, respectively. The faces having the grooves are in contact with the membrane electrode assemblies, and gases are supplied to the membrane electrode assemblies through the gas channels 3a and 3b.

On the surfaces of the non-metal layers 1a and 1b, the portions which are in contact with the membrane electrode assemblies, are preferably surface-treated with a water repellent containing fluorine. By the presence of the water repellent on the surfaces, it is possible to prevent retention of water formed by the reaction at the membrane electrode assemblies at the non-metal layers 1a and 1b, whereby supply of the fuel gas or the oxidant gas to the membrane electrode assemblies can be maintained properly. Further, it is possible to prevent swelling of the non-metal layer due to penetration of water into the interior of the non-metal layer.

In the metal layer 2, a fluid channel 4 for cooling is internally formed, and this metal layer 2 will be described in further detail with reference to FIGS. 2(a) and (b). FIG. 2(a) is a plan view of a metal substrate 2a constituting the metal layer 2 of the separator, and FIG. 2(b) is a cross-sectional view along line B–B' of FIG. 2(a) and a cross-sectional view of a metal substrate 2b paired with the metal substrate 2a. In the metal substrate 2b, a groove which constitutes a fluid channel for cooling, is formed symmetrically to the metal substrate 2a.

The metal layer 2 is obtained by putting together the metal substrate 2a and the metal substrate 2b to be paired, so that the faces on which grooves are formed, face to each other so that the positions of grooves 4a and 4b to constitute the flow channel for cooling will agree, and bonding contacting faces 7a and 7b. Here, as the bonding method, welding, soldering, diffusion bonding or bonding with an adhesive may, for example, be mentioned.

Coating films 5a and 5b containing ceramics are formed on the surfaces of the grooves 4a and 4b constituting the fluid channel for cooling, respectively, formed on the metal substrates 2a and 2b. Accordingly, the fluid for cooling will be in direct contact with such coating films 5a and 5b.

Further, layers 6a and 6b which contain ceramics and which are disposed at the interfaces between the metal layer and the non-metal layer, are formed on the surfaces of the sides of the metal substrates 2a and 2b on which the fluid channels 4a and 4b for cooling are not formed.

The coating films 5a and 5b and the layers 6a and 6b disposed at the interfaces between the metal layer and the non-metal layer, are layers each containing ceramics and having a resistivity of at most $3 \times 10^{-4}$ Ω·cm, and their constituting materials may be the same or different. Preferred components and method for forming them are common and will be described in the following summary as a description of the coating film.

The ceramics contained in the coating film is preferably one which is excellent in corrosion resistance even in a steam atmosphere within a temperature range of from room temperature to the vicinity of 150° C. in which the fuel cell is operated and which is capable of maintaining a stabilized resistivity, and a nitride, a boride, a carbide, a silicide or a phosphide of a metal, or a composite compound thereof, is preferred. As such a metal, a rare earth element such as yttrium, lanthanum, cerium or samarium, iron, nickel, cobalt, chromium, niobium, tantalum, titanium, zirconium, vanadium, hafnium, palladium, tungsten or molybdenum, can preferably be employed. As the ceramics, specifically, titanium carbide, titanium boride, titanium nitride, tungsten silicide, or tantalum nitride, is, for example, preferred. These may be used alone or may be used in an admixture of two or more of them.

In the case of the coating film having ceramics dispersed in metal, such metal is preferably one excellent in corrosion resistance, and it is preferably at least one member selected from the group consisting of a platinum group element, gold, nickel and tungsten. The content of ceramics in this coating film is preferably is from 1 to 90%, particularly preferably from 10 to 60%, it based on the total mass of the coating film.

The thickness of the coating film to be formed on the metal surface is preferably from 0.1 µm to 0.3 mm, particularly preferably from 1 µm to 0.1 mm. If it is thinner than 0.1 µm, it tends to be difficult to form a continuous coating film or layer having adequate corrosion resistance. If it is thicker than 0.3 mm, even if a material having a low resistivity is employed, the resistance of the coating film or layer tends to be high, whereby it tends to be difficult to take out the energy efficiently from the fuel cell. Further, the output per unit volume of the fuel cell tends to be small.

The coating film to be formed on the metal surface, may be formed in a pattern such as a strip pattern, a line pattern, an island pattern or a dotted pattern. The coating film or layer may be formed regularly or irregularly, and the thickness of the coating film may be uniform or non-uniform.

As a method for forming the coating film, a thick film-forming method such as a screen printing method, a doctor blade method, a spray method, a flame spraying method or an ion plating method, or a thin film-forming method such as a CVD method or a PVD method such as a sputtering method, may be employed. Otherwise, the coating film having ceramics dispersed in metal may be formed by a dispersion plating method wherein plating is carried out by using ceramics as a dispersant and a metal as a binder. The above-mentioned dispersion plating method is simple and preferred in a case where the production is carried out on an industrial scale, since the coating film can firmly be bonded to the metal substrate without peeling of the coating film even when the thermal expansion coefficient is substantially different between the ceramics and the metal for constituting the separator.

Further, an interlayer may be present between the above-mentioned coating film and the metal substrate in order to improve the adhesiveness. As such an interlayer, a layer of a metal excellent in corrosion resistance such as titanium, nickel, cobalt, gold or platinum, may, for example, be mentioned.

The thickness of the metal layer 2 is required to be at least a thickness whereby the non-metal layers 1a and 1b can sufficiently be shielded from the fluid for cooling. Further, in order to increase the energy density per unit weight or unit volume of the fuel cell, the thinner the thickness of the metal layer 2, the better. Accordingly, the thickness of the metal layer 2 is preferably from 1 $\mu$m to 2 mm, particularly preferably from 10 $\mu$m to 1 mm.

On the other hand, the thickness of the non-metal layers 1a and 1b is preferably from 1 $\mu$m to 1 mm. If it is less than 1 $\mu$m, the metal layer 2 and the membrane electrode assemblies can not substantially be separated, and if it exceeds 1 mm, brittleness of the non-metal layer tends to be remarkable, whereby the mechanical strength and the reliability are likely to decrease. More preferably, it is from 10 $\mu$m to 0.5 mm.

When the non-metal layers 1a and 1b are molded products of e.g. expanded graphite, as a method for bonding the non-metal layers 1a and 1b and the metal layer 2, it is preferred to employ, for example, bonding by pressing or bonding with silver solder. Otherwise, the non-metal layers 1a and 1b may be formed on the metal layer 2 by printing or coating by means of a conductive paste containing a highly electrically conductive carbon material or the like, or the non-metal layers 1a and 1b may be formed by a thin film-forming method such as a vapor deposition method (a chemical vapor deposition method, an ion plating method or a physical vapor deposition method such as a sputtering method) or a flame spraying method.

As the printing method or the coating method, screen printing, gravure printing, ink jet printing, electrostatic coating, a doctor blade method or a spray method may, for example, be mentioned. By these methods, the non-metal layers 1a and 1b having gas channels can easily be formed at a low cost on the metal layer 2 or on the layers 6a and 6b disposed at the interfaces between the metal layer and the non-metal layer, such being desirable. It is further preferred that the non-metal layers 1a and 1b obtained by printing or coating, are baked and then pressed by e.g. pressing for high densification thereby to improve the electrical conductivity and mechanical strength.

In the case of using the conductive paste, the solvent therefor may, for example, be an aliphatic hydrocarbon such as kerosene or petroleum naphtha, an aromatic hydrocarbon such as toluene, xylene or an aromatic naphtha, a ketone such as methyl ethyl ketone or cyclohexanone, an ether such as butyl acetate or ethyl acetate, an alcohol such as ethyl alcohol or isopropyl alcohol, a glycol ether such as methyl cellosolve or ethyl cellosolve acetate, or an animal or vegetable oil such as linseed oil or hemp-seed oil. Further, a binder may be incorporated as the case requires. As such a binder, a synthetic resin such as an acrylic resin, a vinyl resin, an epoxy resin, urethane, polyester or urea, or a fiber such as nitrocellulose, ethylcellulose or cellulose atbutyrate, may, for example, be mentioned.

The baking temperature is preferably from 200 to 400° C. to facilitate carbonization of the binder and not to oxidize the metal layer. Further, pressing may be uniaxial pressing or isostatic pressing, but it is preferably from 10 to 200 kg/cm$^2$ in order to highly densify the non-metal layers thereby to increase the electrical conductivity.

Figure 3:
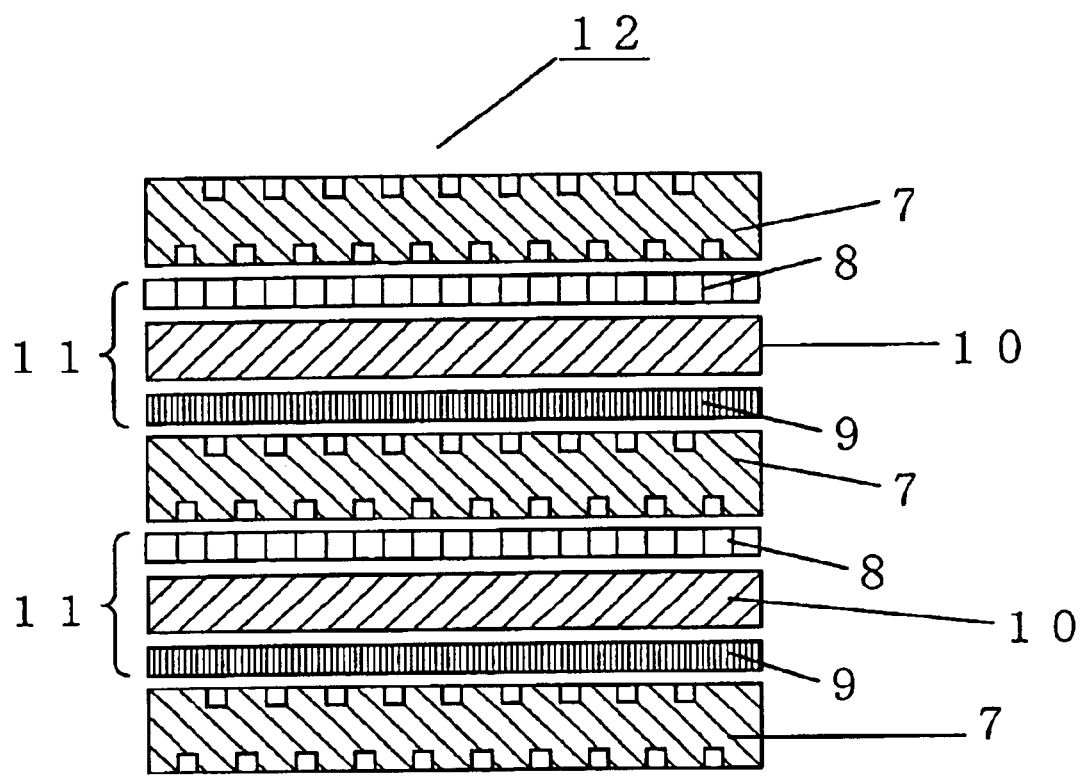
FIG. 3 is a cross-sectional view of a polymer electrolyte fuel cell of the present invention.

FIG. 3 shows a cross-sectional view of a polymer electrolyte fuel cell 12 of the present invention employing the above-described separator 7. On one side of a membrane-form polymer electrolyte 10, a fuel electrode 8 is disposed, and on the other side, an air electrode 9 is disposed, to constitute a membrane electrode assembly 11. A plurality of membrane electrode assemblies 11 are laminated via separators 7. From separators 7, a fuel gas containing hydrogen is supplied to the fuel electrode 8, and an oxidant gas containing oxygen is supplied to the air electrode 9.

The membrane electrode assembly 11 is obtained, for example, as follows. A mixture of a catalyst having a metal catalyst such as platinum supported on a carbon material such as activated carbon, with a water repellent, etc., is coated or sprayed on a carbon paper to prepare a gas diffusion electrode. Two sheets of such an electrode are prepared as a fuel electrode 8 and an air electrode 9. Then, the fuel electrode 8 and the air electrode 9 are disposed to face each other, and a polymer electrolyte 10 made of an ion exchange membrane is interposed therebetween, followed by bonding by a hot pressing method to unify the air electrode/the polymer electrolyte/the fuel electrode to obtain a membrane electrode assembly 11.

The above ion exchange membrane is preferably made of a fluorine-containing carbon polymer having sulfonic groups, from the viewpoint of the chemical and electrical stability.

When the polymer electrolyte fuel cell 12 of the present invention is used, for example, in an environment where vibration or shock is likely to be imparted in the operation as in an application to an engine for an automobile, the long term reliability of the operation of the cell is remarkably improved as compared with a fuel cell employing a separator made of a carbon material.

Further, by forming a layer containing ceramics at a portion of the separator which is in contact with the fluid for cooling or at the interface between the non-metal layer and the metal portion, a constant performance of the fuel cell not different from the initial stage, can be maintained over a long period of time.

Now, the present invention will be described in further detail with reference to Examples (Examples 1 to 4) and Comparative Examples (Examples 5 and 6). However, the present invention is by no means restricted thereto.

EXAMPLE 1

A metal substrate made of an aluminum alloy (aluminum content: 96%) of alloy No. A5052 as stipulated by JIS-H4000 and having a width of 150 mm, a height of 150 mm and a thickness of 0.3 mm, was subjected to pressing to form a groove for a fluid channel for cooling with a width of 1.5 mm and a depth of 0.15 mm in a pattern as shown in FIG. 2(a). On the surface of this groove and on the surface of the side where no groove was formed, a Ti layer having a thickness of 0.5 μm was formed as a primer layer by an ion plating method, and a titanium nitride coating film having a thickness of 10 μm was further formed thereon. The resistivity of this titanium nitride coating film was 2×10$^{-4}$ Ω·cm.

The same metal substrate as the above metal substrate except that the groove is formed symmetrically, was prepared. As shown in FIG. 2(b), these two sheets of metal substrates were overlaid each other so that the sides on which the grooves were formed, faced each other so that the positions of the grooves of these two sheets of metal substrates agreed to each other, and bonded by welding to obtain a metal layer to constitute a separator.

Then, using an expanded graphite having a thickness of 1.5 mm (tradename: Grafoil, manufactured by UCAR Co.), a groove to constitute a gas channel with a width of 2 mm and a depth of 0.35 mm, was formed on one side by pressing in a pattern as shown in FIGS. 1(a) and (b), to obtain a non-metal layer. Here, as shown in FIG. 1(a), the groove was formed as meandering, as shown in FIG. 1(a), whereby the distance between the adjacent grooves formed in parallel by meandering, was set to be 3 mm. Two sheets of such a non-metal layer were prepared so that the positions of the grooves were different, as shown in FIG. 1(b).

The above two non-metal layers were put together so that the faces on which no grooves were formed, faced each other, with the above metal layer interposed therebetween. In this state, three layers of non-metal layer/metal layer/non-metal layer were press-bonded to obtain a separator.

Then, on one side of a carbon cloth, a catalyst having platinum supported on carbon black was coated to form a catalyst layer thereby to obtain a gas diffusion electrode. Two sheets of such a gas diffusion electrode were disposed so that the faces on which the catalyst layers were formed, faced each other, and a perfluorocarbon sulfonic acid type ion exchange membrane (Flemion R, tradename, manufactured by Asahi Glass Company, Limited) was sandwiched between them, followed by hot pressing to obtain a membrane electrode assembly.

20 sheets of the above separator and 19 sheets of the above membrane electrode assembly were alternately laminated, and the entirety was clamped to obtain a polymer electrolyte fuel cell. Ten such fuel cells were prepared, and with respect to each of them, a dropping test was repeated ten times. The dropping test was carried out in such a manner that with the side of separator facing downwardly, it was dropped straightly from a position at a height of 50 cm onto a steel plate having a thickness of 5 cm. After the dropping test, air was permitted to flow through the gas channel of the separator under a pressure of 5 kg/cm$^2$ to carry out a gas leak test, whereby with 10 samples, there was no problem with respect to the air tightness.

One of the above fuel cells was taken out, and as a fuel gas, hydrogen gas under normal pressure and as an oxidant gas, air under normal pressure, were permitted to flow, so that the utilization ratios would be 70% and 40%, respectively. Further, tap water was permitted to flow through the fluid channel for cooling under a water pressure of 5 kg/cm$^2$ for cooling, and the fuel cell was operated at 80° C. at a current of 140 A, whereby the initial voltage was measured as the initial output. Then, the current was continuously conducted, and the voltage after expiration of 5000 hours was measured, and the ratio (%) to the initial voltage value was calculated as the relative output. The results are shown in Table 1.

EXAMPLE 2

Using a metal substrate made of titanium having a purity of 99.4% and having a width of 150 mm, a height of 150 mm and a thickness of 0.2 mm, a groove to constitute a fluid channel for cooling was formed on one side by etching in the same pattern as in Example 1. On the surface of this groove and on the surface of the side on which no groove was formed, plating was applied by means of a nickel watt bath having particles of titanium nitride dispersed (the distribution range of the crystal particle sizes: 0.1 to 3 μm, resistivity: 4.0×10$^{-5}$ Ω·cm) to form a coating film having a thickness of 10 μm. The resistivity of this titanium nitride/nickel coating film was 3.0×10$^{-5}$ Ω·cm.

The same metal substrate as the above metal substrate made of titanium except that the groove is formed symmetrically, was prepared, and in the same manner as in Example 1, the pair of metal substrates were bonded to obtain a metal layer to constitute a separator.

A separator was prepared in the same manner as in Example 1 except that the above metal layer was employed, and a polymer electrolyte fuel cell was prepared in the same manner as in Example 1, and the same dropping tests as in Example 1 were carried out, and further the gas leak test was carried out, whereby there was no problem with respect to the air tightness. Then, evaluation was carried out in the same manner as in Example 1. The results are shown in Table 1.

EXAMPLE 3

Using a metal substrate made of SUS316 and having a width of 150 mm, a height of 150 mm and a thickness of 0.15 mm, a groove to constitute a fluid channel for cooling was formed on one side in the same manner as in Example 1. On the surface of this groove and on the surface of the side on which no groove was formed, a coating film having a thickness of 0.3 μm made of molybdenum siliside, was formed by sputtering. The resistivity of this molybdenum siliside coating film was 2.2×10$^{-5}$ Ω·cm.

The same metal substrate to be paired as the above metal substrate made of SUS316 except that the groove was formed symmetrically, was prepared, and in the same manner as in Example 1, the pair of metal substrates were bonded to obtain a metal layer to constitute a separator.

A separator was prepared in the same manner as in Example 1 except that the above metal layer was employed, a polymer electrolyte fuel cell was prepared in the same manner as in Example 1; the same dropping tests as in Example 1 were carried out, and further the gas leak test was carried out, whereby there was no problem with respect to the air tightness. Then, evaluation was carried out in the same manner as in Example 1. The results are shown in Table 1.

EXAMPLE 4

Using a metal substrate made of SUS316 and having a width of 150 mm, a height of 150 mm and a thickness of 0.15 mm, a groove to form a fluid channel for cooling was formed on one side in the same manner as in Example 1. On the surface of this groove and on the surface of the side on which no groove was formed, a coating film having a thickness of 0.7 μm made of tungsten carbide was formed by sputtering. The resistivity of this tungsten carbide coating film was 3.4×10$^{-5}$ Ω·cm.

The same metal substrate to be paired as the above metal substrate made of SUS316 except that the groove was formed asymmetrically, was prepared, and in the same manner as in Example 1, the pair of metal substrates were bonded to obtain a metal layer to constitute a separator.

Then, a conductive paste having carbon black particles (Ketjen EC) having an average particle size of 35 nm dispersed in a solvent mixture comprising xylene and ethyl carbitol in a volume ratio of 1:1 using an ethyl cellulose resin as a binder (carbon black:binder:solvent mixture= 30:30:40 in mass ratio), was coated on both sides of the above metal layer (on the tungsten carbide coating film) by screen printing. To remove the solvent, it was dried at 140° C. for 30 minutes and then baked in atmospheric air at 350° C. for 3 hours. Then, by applying a pressure of 30 kg/cm$^2$ perpendicularly to the plane direction, a non-metal layer of the same shape as in Example 1 except that the thickness of the groove portion to constitute a gas channel was 15 $\mu$m, and the thickness of the rib portion was 0.2 mm, was formed, and this was used as a separator.

A polymer electrolyte fuel cell was prepared in the same manner as in Example 1 except that this separator was employed, the same dropping test as in Example 1 was carried out, and further, the gas leak test was carried out, whereby there was no problem with respect to the air tightness. Then, evaluation was carried out in the same manner as in Example 1. The results are shown in Table 1.

EXAMPLE 5

Instead of the substrate made of an aluminum alloy in Example 1, a substrate made of expanded graphite having the same size as said substrate, was employed, and a groove to constitute a fluid channel for cooling was formed on one side in the same pattern as in Example 1.

The same substrate to be paired as the above substrate made of expanded graphite except that the groove was formed asymmetrically, was prepared, and the pair of substrates were put together so that the faces of the pair of substrates on which the grooves were formed, faced each other so that the positions of the grooves agreed, and a polymer electrolyte fuel cell was prepared in the same manner as in Example 1 except that this assembly was used instead of the metal layer. The same dropping test as in Example 1 was carried out, and further the gas leak test was carried out, whereby there was no problem with respect to the air tightness. Then, evaluation was carried out in the same manner as in Example 1. The results are shown in Table 1.

EXAMPLE 6

A layer having the same size and the same shape as the non-metal layer in Example 1 was prepared by using the aluminum alloy used in Example 1. A separator was prepared in the same manner as in Example 1 except that this layer was used instead of the non-metal layer, and the bonding with the metal layer was carried out by mechanical processing.

A polymer electrolyte fuel cell was prepared in the same manner as in Example 1 except that this separator was employed. The same dropping test as in Example 1 was carried out, and further, the gas leak test was carried out, whereby there was no problem with respect to the air tightness. Then, evaluation was carried out in the same manner as in Example 1. The results are shown in Table 1.

TABLE 1

|  | Initial output (V) | Relative output (%) |
| --- | --- | --- |
| Example 1 | 0.725 | 98 |
| Example 2 | 0.730 | 96 |
| Example 3 | 0.720 | 97 |
| Example 4 | 0.715 | 96 |

TABLE 1-continued

|  | Initial output (V) | Relative output (%) |
| --- | --- | --- |
| Example 5 | 0.735 | 60 |
| Example 6 | 0.725 | 85 |

INDUSTRIAL APPLICABILITY

According to the present invention, even when the polymer electrolyte fuel cell is used under an environmental condition where a stress other than the compression stress or a mechanical shock is imparted, the separator will not be destroyed, cracking will not form, and the air tightness of the fuel cell can be maintained while maintaining the initial shape. Further, the separator in the present invention is easy for mechanical shaping and processing and can readily be recycled. Further, the separator in the present invention is light in weight as compared with a conventional separator made of metal. Accordingly, the polymer electrolyte fuel cell of the present invention is light in weight, provides a high output and is excellent in durability for a long period of time.

What is claimed is:

1. A polymer electrolyte fuel cell comprising a plurality of membrane electrode assemblies laminated via separators, each assembly comprising a membrane-form polymer electrolyte and a pair of a fuel electrode and an air electrode facing each other via the electrolyte, wherein the separator has a fuel gas channel for supplying a fuel gas to the fuel electrode, an oxidant channel for supplying an oxidant to the air electrode and a fluid channel for removing a heat generated by a reaction out of the cell system, and the separator is made of a metal/non-metal composite material which separator has faces made of non-metal which are in contact with the membrane electrode assemblies and has side walls of the fluid channel made of metal.

2. The polymer electrolyte fuel cell according to claim 1, wherein the separator comprises a layer made of non-metal having the fuel gas channel on its surface, a layer made of metal having the fluid channel internally and a layer made of non-metal having the oxidant channel on its surface, where the layer made of metal is disposed between the layers made of non-metal which are laminated, and the fuel gas channel and the oxidant channel are disposed on the surfaces of the separator.

3. The polymer electrolyte fuel cell according to claim 1 or 2, wherein the metal is a member selected from the group consisting of a metal containing aluminum in an amount of at least 80%, a metal containing titanium in an amount of at least 80% and stainless steel, and the non-metal comprises carbon material as the main component.

4. The polymer electrolyte fuel cell according to claim 1 or 2, wherein the non-metal is made of a highly electrically conductive carbon material.

5. The polymer electrolyte fuel cell according to claim 1 or 2, wherein the faces of the separator which are in contact with the membrane electrode assemblies, are composed of a molded body made of expanded graphite particles.

6. The polymer electrolyte fuel cell according to claim 4, wherein the separator is one wherein a layer made of a highly electrically conductive carbon material is formed on both sides of the layer made of metal having the fluid channel internally, by a printing method or a coating method employing a conductive paste containing the highly electrically conductive carbon material.

7. The polymer electrolyte fuel cell according to claim 1 or 2, wherein a coating film containing ceramics and having a resistivity of at most $3 \times 10^{-4}$ Ω·cm, is formed on the surface of the side walls of the fluid channel.

8. The polymer electrolyte fuel cell according to claim 1 or 2, wherein a layer containing ceramics and having a resistivity of at most $3 \times 10^{-4}$ Ω·cm, is disposed at the interface between the metal and the non-metal components of the separator.

9. The polymer electrolyte fuel cell according to claim 3, wherein the non-metal is made of a highly electrically conductive carbon material.

10. The polymer electrolyte fuel cell according to claim 3, wherein the faces of the separator which are in contact with the membrane electrode assemblies, are composed of a molded body made of expanded graphite particles.

11. The polymer electrolyte fuel cell according to claim 9, wherein the separator is one wherein a layer made of a highly electrically conductive carbon material is formed on both sides of the layer made of metal having the fluid channel internally, by a printing method or a coating method employing a conductive paste containing the highly electrically conductive carbon material.

12. The polymer electrolyte fuel cell according to claim 3, wherein a coating film containing ceramics and having a resistivity of at most $3 \times 10^{-4}$ Ω·cm, is formed on the surface of the side walls of the fluid channel.

13. The polymer electrolyte fuel cell according to claim 3, wherein a layer containing ceramics and having a resistivity of at most $3 \times 10^{-4}$ Ω·cm, is disposed at the interface between the metal and the non-metal and non-metal components of the separator.

14. The polymer electrolyte fuel cell according to claim 4, wherein a layer containing ceramics and having a resistivity of at most $3 \times 10^{-4}$ Ω·cm, is disposed at the interface between the metal and the non-metal components of the separator.

15. The polymer electrolyte fuel cell according to claim 5, wherein a coating film containing ceramics and having a resistivity of at most $3 \times 10^{-4}$ Ω·cm, is formed on the surface of the side walls of the fluid channel.

16. The polymer electrolyte fuel cell according to claim 5, wherein a layer containing ceramics and having a resistivity of at most $3 \times 10^{-4}$ Ω·cm, is disposed at the interface between the metal and the non-metal components of the separator.

17. The polymer electrolyte fuel cell according to claim 6, wherein a coating film containing ceramics and having a resistivity of at most $3 \times 10^{-4}$ Ω·cm, is formed on the surface of the side walls of the fluid channel.

18. The polymer electrolyte fuel cell according to claim 6, wherein a layer containing ceramics and having a resistivity of at most $3 \times 10^{-4}$ Ω·cm, is disposed at the interface between the metal and the non-metal components of the separator.

19. The polymer electrolyte fuel cell according to claim 7, wherein a layer containing ceramics and having a resistivity of at most $3 \times 10^{-4}$ Ω·cm, is disposed at the interface between the metal and the non-metal components of the separator.

* * * * *